United States Patent [19]

Lochmann et al.

[11] 3,974,111

[45] Aug. 10, 1976

[54] POLYMERIC ALKOXIDES BASED ON HYDROXYALKYL METHACRYLATES AND A METHOD FOR THEIR PREPARATION

[75] Inventors: Lubomír Lochmann; Jiří Čoupek; Jiří Trekoval, all of Prague, Czechoslovakia

[73] Assignee: Ceskoslovenska akademie ved, Prague, Czechoslovakia

[22] Filed: Dec. 18, 1974

[21] Appl. No.: 534,153

[30] Foreign Application Priority Data

Dec. 28, 1973  Czechoslovakia ................. 9065-73

[52] U.S. Cl. .......................... 260/2.5 R; 260/2.1 E; 526/14; 526/47; 526/320
[51] Int. Cl.² ..................... C08F 20/26; C08F 8/42
[58] Field of Search ......... 260/2.5 R, 2.1 E, 86.1 R, 260/89.5 S, 485 J, 486 R, 86.1 E; 450/608.5, 618.5, 89.5 R, 89.5 A

[56] References Cited
UNITED STATES PATENTS

| | | | |
|---|---|---|---|
| 3,220,960 | 11/1965 | Wichterle | 260/86.1 R |
| 3,369,003 | 2/1968 | Verdol | 260/86.1 R |
| 3,515,656 | 6/1970 | Huang et al. | 260/86.1 R |

*Primary Examiner*—Edward J. Smith

[57] ABSTRACT

Polymeric alkoxides based on hydroxyalkyl methacrylates consist of units

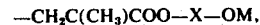

$$-CH_2C(CH_3)COO-X-OM,$$

where X is the organic bivalent group with the straight or branched $C_2-C_{20}$ chain and M is Li, Na or K. The polymer has advantageously a heterogeneous structure of a macroporous gel with the inner surface 0.5 – 500 m²/g. Polymeric alkoxides are prepared by treatment of a homopolymer or copolymer containing hydroxyl groups with the necessary amount of an alkali metal organic compound dissolved in an aprotic solvent, to convert the hydroxyl groups. Alkyl, aralkyl or aryl $C_1$ to $C_{30}$ derivatives of Li, Na or K are used as the alkali metal organic compounds.

4 Claims, No Drawings

POLYMERIC ALKOXIDES BASED ON HYDROXYALKYL METHACRYLATES AND A METHOD FOR THEIR PREPARATION

The invention relates to polymeric alkoxides on the basis of hydroxyalkyl methacrylates and their copolymers with alkylene dimethacrylates which contain alkoxide groups and to a method for their preparation by the reaction of organic compounds of alkali metals with a carrier containing covalently bonded hydroxyalkyl groups in its structure. These materials find their application as effective polymeric reagents.

The low-molecular-weight alkali metal alkoxides are often used as reactive intermediates in organic chemistry or as condensation agents and catalysts for various reactions. It is often convenient to use the catalyst or the condensation agent in a heterogeneous phase, because it can be readily removed from the resulting reaction mixture. Thus, for example, some ion exchangers in the H-cycle are commonly used in acid catalyzed reactions. Although some rather basic anion exchangers are commercially available, a polymeric organic compound of the basicity comparable with alkali metal alkoxides has been missing up to the present time. Analogously to alkali metal alkoxides, the above mentioned compounds may be converted into other derivatives having the modified properties and the required reactivity by subsequent chemical transformations.

Besides linear polymers and copolymers, the cross-linked three-dimensional materials can be also advantageously used as the polymeric reactive compounds. They either swell in the contact with solvents or are noted for their macroporous structure with the large inner surface also in a dry state, according to the concentration of a crosslinking agent and the reaction conditions of copolymerization. The selectivity of the porous materials in their application, e.g. as catalysts, is enhanced by the possible control of porosity and by limiting the penetration of compounds with larger molecules than is the diameter of pores to the reactive sites in this way. The carriers may be also prepared with the reaction taking place exclusively on the inner surface of pores, which fact enables the access of reacting components to the reaction site defined by the position of the fixed functional group (alkoxide) as well as leading the reaction product away from the particle. The slow diffusion of molecules through the three-dimensional polymeric network is replaced, in this case, by the more rapid diffusion in the solution present in the free volume of pores or even by convection if the pores are interconnected and the particle has the draining character.

Fundamental polymeric carriers based on hydroxyalkyl methacrylates are protected by Czechoslovak patent Nos. 148,828 and 150,819. According to the present invention, these materials can be transformed into polymeric alkoxides.

The objective of this invention are polymeric alkoxides of alkali metals based on poly(hydroxyalkyl methacrylates) containing units of the general formula

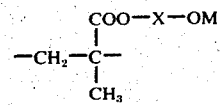

where X is the bivalent organic substituent with the straight or branched chain $C_2 - C_{20}$ and M means Li, Na or K. These polymeric alkoxides possess an advantageous heterogeneous structure of the macroporous gel with the inner surface $0.5 - 500$ m$^2$/g. They are prepared by treatment of the fundamental polymers containing free hydroxyl groups with alkali metal organic compounds in an aprotic medium at the temperature $-70°$ to $+50°C$ according to the reaction scheme

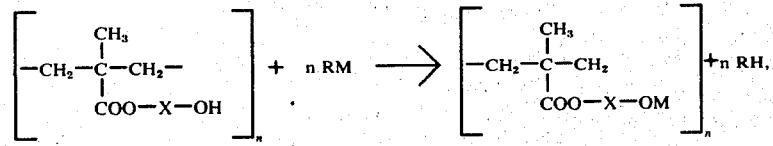

where X and M have the above given meaning and R is alkyl, aralkyl or aryl with $1 - 30$ carbon atoms.

The alkoxide polymer is freed of byproducts after the reaction by washing with a suitable aprotic solvent and, if it is desired, it is dried in vacuum. It is obvious, that all operations with alkoxide polymers have to be carried out under the protective atmosphere of nitrogen or argon, similarly as with the starting organometallic compounds. The achieved maximum conversion of the hydroxyl groups present in the polymer into alkoxide groups is high (it achieves around 80 percent). It is given primarily by the polymer composition and microstructure, i.e. by the steric accessibility of reacting groups. The reaction rate of hydroxyl groups on the gel surface is comparable with the rate of conversion in a solution. The maximum conversion was achieved within several hours under conditions described in the following examples of performance. The assumed course of the reaction, i.e. the substitution of hydrogen in the hydroxyl group for metal, was proved, besides by the analysis of transformed functional groups, also by infrared spectra of alkoxide polymers which exhibited decrease of absorption bands of the frequency about 3500 cm$^{-1}$ (the O-H bonds vibrations) on the one hand and the formation of new absorption bands in the region below 600 cm$^{-1}$ (the O-M bond vibrations) on the other.

The obtained alkoxide polymers showed properties of low-molecular-weight alkoxides which were, however, affected to some extent by the fixation of the reactive alkoxide groups to the polymer chain. The reactions with organic compounds, e.g. with acyl halides, enabled preparation of various derivatives of the starting polymer. The alkoxide polymer may be advantageously used in numerous other organic reactions either as reacting components or as catalysts.

The following examples are given to illustrate the objective of this invention without, however, limiting the scope of the invention to them.

EXAMPLE I

A copolymer of 60 percent of 2-hydroxyethyl methacrylate and 40 percent of ethylene dimethacrylate in the form of globular particles of the diameter 0.1 mm and the mean pore diameter about 4000 A was extracted with tetrahydrofuran and dried in vacuum before use. The extracted copolymer (2.18 wt. parts) was allowed to swell in 27 wt. parts of tetrahydrofuran under a protective atmosphere of dried nitrogen for 8 hours. Then, 0.331 M solution of triphenylmethyllithium in tetrahydrofuran was gradually added under stirring at the laboratory temperature in portions 0.5 – 1.0 wt. parts, each portion being added first after discolouration of the reaction mixture. The total amount 21.6 wt. parts of the solution of the organolithium compound was added in this way during 1 hour, which corresponds to about 80 percent of the present hydroxyl groups reacted. After another 10 min., the reaction mixture was filtered and the alkoxide polymer was six times washed always with 30 wt. parts of tetrahydrofuran and by 15 minutes of stirring. The consumption of the washing solvent may be reduced by elution of the polymer in a column (the consumption is about one half). The polymer was dried at 60°C for 6 hours in vacuum 1 mm Hg. The yield of 2.21 wt. parts of alkoxide corresponds to 98% of theory. Alkalinity of the alkoxide polymer was determined after its hydrolysis by the acidimetric analysis. It follows from the results of the analysis that 71 percent of the hydroxyl groups present in the polymer were transferred into alkoxide. The difference between the consumption of the organometallic reagent and the titrimetrically determined content of alkoxide groups may be imputed to carboxylic groups which can react with the organometallic compound but their alkalinity is not titrimetrically expressed in aqueous solutions. These lithium carboxylates were also visible in the infrared spectrum of the alkoxide polymer.

EXAMPLE II

Analogously to Example 1, 9.8 wt. parts of triphenylmethylsodium dissolved in 80 wt. parts of tetrahydrofuran was added in portions into the solution of 8.92 wt. parts of a copolymer containing 60% of 2-hydroxyethyl methacrylate and 40% of ethylene dimethacrylate in 90 ml of tetrahydrofuran. The yield was 10.3 wt. parts of the alkoxide polymer. According to the acidimetric titration, 70% of hydroxyl groups were converted into alkoxide groups. This result was confirmed by an IR spectrum of the polymer.

EXAMPLE III

Analogously to Example II, 22.1 wt. parts of triphenylmethylpotassium dissolved in 170 wt. parts of tetrahydrofuran was added in portions into 16.6 wt. parts of a copolymer of 2-hydroxyethyl methacrylate with ethylene dimethacrylate in 200 ml of tetrahydrofuran at the temperature −50°C. The reaction proceeded for 3 hours and the yield was 17.5 wt. parts of the polymeric alkoxide.

EXAMPLE IV

Analogously to Example I, 14.3 wt. parts of 1 M solution of n-butyllithium was added in portions to 4.40 wt. parts of a copolymer of 2-hydroxyethyl methacrylate with ethylene dimethacrylate in 100 ml of tetrahydrofuran at the temperature −50°C. The reaction proceeded for 2 hours yielding 4.40 wt. parts of the polymeric alkoxide.

We claim:

1. A copolymer having a polymerized alkylene dimethacrylate having repeating units represented by the formula

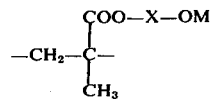

wherein X is an alkylene group having from 2 to 20 carbon atoms and M is Li, Na or K.

2. The copolymer of claim 1, wherein said copolymer possesses a heterogeneous structure of a macroporous gel having an inner surface area of from 0.5 to 500 m²/g.

3. The method of preparing the copolymer of claim 1, comprising the step of treating a copolymer containing repeating units represented by the formula

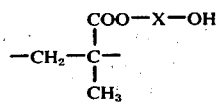

with a solution of an alkali metal organic compound in a aprotic solvent in the amount necessary for conversion of the hydroxyl groups, said treatment being at a temperature in the range from −70° to 50°C, and wherein said alkali metal organic compound is an alkyl, aralkyl or aryl derivative of Li, Na or K.

4. The copolymer of claim 1 containing hydroxyalkyl methacrylate repeating units.

* * * * *